US008838148B2

(12) United States Patent
Shook et al.

(10) Patent No.: US 8,838,148 B2
(45) Date of Patent: *Sep. 16, 2014

(54) LOCATION BASED WIRELESS TOWER CACHING

(75) Inventors: Aaron K. Shook, Raleigh, NC (US);
Erik J. Burckart, Raleigh, NC (US);
Gennaro A. Cuomo, Cary, NC (US);
Andrew Ivory, Wake Forest, NC (US);
Victor S. Moore, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,329

(22) Filed: Feb. 28, 2012

(65) Prior Publication Data

US 2012/0214514 A1    Aug. 23, 2012

Related U.S. Application Data

(62) Division of application No. 12/977,980, filed on Dec. 23, 2010.

(51) Int. Cl.
*H04W 24/00* (2009.01)
*H04W 4/02* (2009.01)
*H04L 29/08* (2006.01)
*H04W 88/08* (2009.01)

(52) U.S. Cl.
CPC ............. *H04W 4/02* (2013.01); *H04L 67/2842* (2013.01); *H04W 88/08* (2013.01)
USPC .................. 455/456.3; 455/456.1; 455/456.2; 455/456.5; 455/525; 340/995.1; 340/995.24; 701/409; 701/425; 701/426

(58) Field of Classification Search
USPC ........... 455/456.3, 456.1; 340/995.1; 701/409
See application file for complete search history.

(56) References Cited

U.S. PATENT DOCUMENTS

| 5,515,283 | A | * | 5/1996 | Desai et al. .................... 701/461 |
| 6,341,133 | B1 | * | 1/2002 | Kawamoto et al. ............ 370/401 |
| 6,941,338 | B1 | | 9/2005 | Madsen |
| 8,095,154 | B1 | | 1/2012 | Wang et al. |
| 8,116,291 | B2 | * | 2/2012 | Annamalai et al. ............ 370/338 |
| 8,130,856 | B1 | * | 3/2012 | Mansour ........................ 375/267 |
| 8,369,871 | B1 | * | 2/2013 | Izdepski et al. ............. 455/456.1 |
| 2002/0090943 | A1 | * | 7/2002 | Kwon ............................ 455/433 |
| 2003/0060190 | A1 | * | 3/2003 | Mallart ......................... 455/414 |
| 2004/0077362 | A1 | * | 4/2004 | Chinomi et al. ........... 455/456.5 |

(Continued)

*Primary Examiner* — Allahyar Kasraian
(74) *Attorney, Agent, or Firm* — Steven M. Greenberg, Esq.; CRGO Law

(57) ABSTRACT

Embodiments of the present invention provide a method, system and computer program product for wireless tower caching. In an embodiment of the invention, a method for wireless tower caching in a radio access network (RAN) can include receiving a response to a request from an end user device wirelessly coupled to a base station of the RAN, determining geographic positioning data for the response and identifying a most geographically wireless tower coupled to the RAN relative to the determined geographic positioning data (such as the closest wireless tower to the determined geographic positioning data). Thereafter, the response can be cached at a cache in a base station of the identified wireless tower.

4 Claims, 2 Drawing Sheets

(56) References Cited

U.S. PATENT DOCUMENTS

| | | | |
|---|---|---|---|
| 2004/0203863 A1* | 10/2004 | Huomo | 455/456.1 |
| 2004/0259573 A1* | 12/2004 | Cheng | 455/456.3 |
| 2006/0030350 A1* | 2/2006 | Mitchell | 455/522 |
| 2009/0265345 A1* | 10/2009 | Carroll | 707/5 |
| 2010/0124924 A1* | 5/2010 | Cheng et al. | 455/434 |
| 2010/0304756 A1* | 12/2010 | Yang | 455/456.1 |
| 2011/0039576 A1* | 2/2011 | Prakash et al. | 455/456.1 |
| 2011/0244892 A1* | 10/2011 | MacManus et al. | 455/457 |
| 2012/0100870 A1* | 4/2012 | Prost et al. | 455/456.1 |
| 2012/0290720 A1* | 11/2012 | Stamoulis et al. | 709/224 |

* cited by examiner

LOCATION BASED WIRELESS TOWER CACHING

CROSS-REFERENCE TO RELATED APPLICATIONS

This application is a Divisional of U.S. application Ser. No. 12/977,980, filed Dec. 23, 2010, currently pending, the entirety of which is incorporated herein by reference.

BACKGROUND OF THE INVENTION

1. Field of the Invention

The present invention relates to content retrieval services provided in a radio access network and more particularly to the caching of retrieved content in a radio access network.

2. Description of the Related Art

The radio access network (RAN) provides for the foundation of modern cellular telephony. The RAN functions to join different end user mobile devices to a core network (CN) such that individuals can enjoy telephonic and data communications wirelessly within a geographic area covered by the various base stations of the radio access network. Generally speaking, the RAN provides the requisite infrastructure to pass both voice and data traffic from the over-the-air medium to both the terrestrial circuit switched communication network and the packet switched data communications network inclusive of the global Internet.

At present, several standards have been implemented in connection with the RAN. Examples include the global system for mobile communications (GSM), the universal mobile telecommunications system (UMTS) and the GSM "Edge" RAN (GERAN). The RAN generally includes multiple different radio network controllers (RNC) each managing a set of base stations providing wireless connectivity to a geographic cell. The entirety of the different RNCs of the RAN are linked to what is known as the cellular data core or CN through a gateway known as the serving generalized radio packet service node (SGSN). The CN provides various services to customers who are connected by the RAN. One of the main functions is to route calls across the public switched telephone network (PSTN). Another is to route data packets onto an Internet protocol (IP) network such as the global Internet so that end users of the RAN can access services provided by a content delivery network (CDN). To that end, the CN includes a gateway known as the gateway GPRS service node (GGSN).

The typical CDN can provide for advanced content delivery services such as content caching and content filtering. Content caching refers to the intermediate temporary storage of previously retrieved content under the assumption that a temporally proximate subsequent request for the content can be satisfied from temporary storage rather than repeating a more time consuming request for content in the CDN. In contrast, content filtering refers to the restriction of the delivery of requested content when the content meets a particular profile such as being published by a particular source or incorporating particular subject matter. In both instances, the packet processing requisite to performing advanced content services often demand that those services are provided within the CN where the communications protocol utilized in the CN is consistent with that of the global Internet—namely the transport control protocol (TCP) over IP.

Even still, some have suggested placing support for content services such as content caching and content filtering within the RAN. In this regard, United States Patent Application Publication No. 20100034089 by Kovvali et al. suggests the placement of content caching services within the RAN and the extraction of TCP/IP payloads from the RAN protocol specific to the RAN. Of note, unlike traditional caching schemes in a traditional computing environments, in a mobile computing environment such as that supported by a RAN, end users traverse the RAN communicating directly with different base stations at different wireless towers along a path of travel. Thus, placing long lasting content services like caching in a base station can result in cached content being rendered largely useless as an end user travels out of range of the wireless tower of the base station.

BRIEF SUMMARY OF THE INVENTION

Embodiments of the present invention address deficiencies of the art in respect to content caching in the RAN and provide a novel and non-obvious method, system and computer program product for wireless tower caching. In an embodiment of the invention, a method for wireless tower caching in a RAN can include receiving a response to a request from an end user device wirelessly coupled to a base station of the RAN, determining geographic positioning data for the response and identifying a most geographically relevant wireless tower coupled to the RAN relative to the determined geographic positioning data (such as the wireless tower closest to the determined geographic positioning data). Thereafter, the response can be cached at a cache in a base station of the identified wireless tower. In this way, the cached content can remain relevant for a significant period of time in as much as the correlation between a likely position of the end user device and the content cached at the base station of the wireless tower at the time of use of the cached content is strong.

In another embodiment of the invention, a RAN based data processing system can be configured for location based wireless tower caching. The system can include different base stations each disposed in a respective wireless tower and each including an antenna, a receiver, a transmitter, a processor, a local cache, and a network interface to a data communications network. The system also can include an RNC coupled to each base station over the data communications network. Further, a caching module can be disposed in each base station and coupled to a cache. Finally, a location based wireless tower caching module can execute in the RNC.

The module can include program code enabled to receive a response to a data request from one of the base stations on behalf of an end user device, to determine geographic positioning data for the response, to identify a wireless tower coupled to the RAN and positioned closest to the determined geographic positioning data, and to direct caching of the response at a cache in a particular one of the base stations of the identified wireless tower. For instance, in one aspect of the embodiment, the response can include a map generated from an address supplied by the end user device or a point of interest of a map generated from an address supplied by the end user device. In another aspect of the embodiment, the geographic positioning data can include geographic positioning system (GPS) coordinates. In yet another aspect of the embodiment, the geographic positioning data can include at least a portion of the address supplied by the end user device.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for wireless tower caching in a RAN. In accordance with an embodiment of the invention, a content request can be received from a mobile communications device in a RAN. The requested content, for example a map or one or more points of interest associated with a geographic position on a map, can be retrieved into the RAN from a content server disposed in a communicatively coupled data communications network such as the global Internet. Thereafter, geographic coordinates associated with the requested content can be compared to known geographic coordinates of different wireless towers in the RAN. Finally, a wireless tower in the RAN with known geographic coordinates most geographically relevant to the geographic coordinates associated with the requested content can be selected and the requested content can be cached in a base station for the selected wireless tower.

Figure 1:
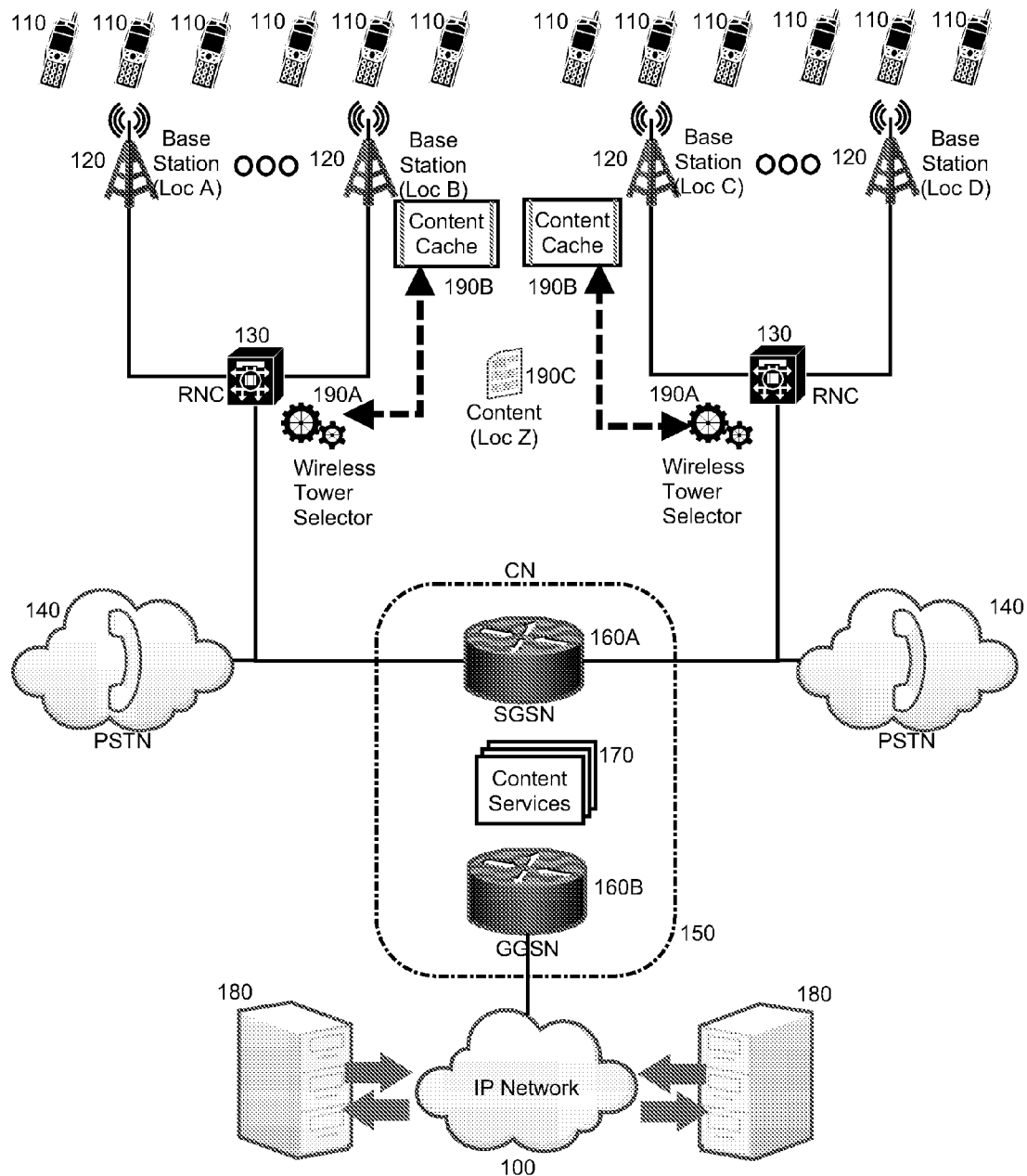
FIG. 1 is a pictorial illustration of a process for wireless tower caching in a RAN.

In further illustration, FIG. 1 pictorially shows a process for wireless tower caching in a RAN. As shown in FIG. 1, a cellular telecommunications network can be provided to include different base stations 120 arranged to provide wireless telephonic access to different end user devices 110 for the PSTN 140. Clusters of the base stations 120 can be communicatively linked to a common RNC 130 that in turn can be coupled to a CN 150 thus forming a RAN. The CN 150 can include both a SGSN 160A acting as a gateway for traffic between the CN 150, the PSTN 140 and each RNC 130, and also a GGSN 160B acting as a gateway between the CN 150 and the data communications network 100—typically the global Internet. The CN 150 itself can support a number of content services 170 as is well known in the art.

Of note, a data processing system for location based wireless tower caching 190A can be disposed in the RNC 130 and can be configured for communicative coupling to different content caches 190B each executing in respectively different base stations 120. The data processing system 190A can include program code that when executed in the data processing system, processes location based content 190C retrieved in response to a content request originating from an end user device 110 by way of a corresponding base station 120, from a content server 180 on the data communications network 100 by way of the CN 150. Specifically, the data processing system 190A can determine geographic positioning data associated with the content 190C such as particular GPS coordinates associated with a point of interest on a map, or an address from which a map is produced. The data processing system 190A further can identify a wireless tower hosting a correspondingly different one of the base stations 120 at a position most geographically relevant to the geographic positioning data associated with the content 190C (for example the closest wireless tower). Thereafter, the data processing system 190A can direct caching of the content 190C in a base station 120 in the selected wireless tower.

Figure 2:
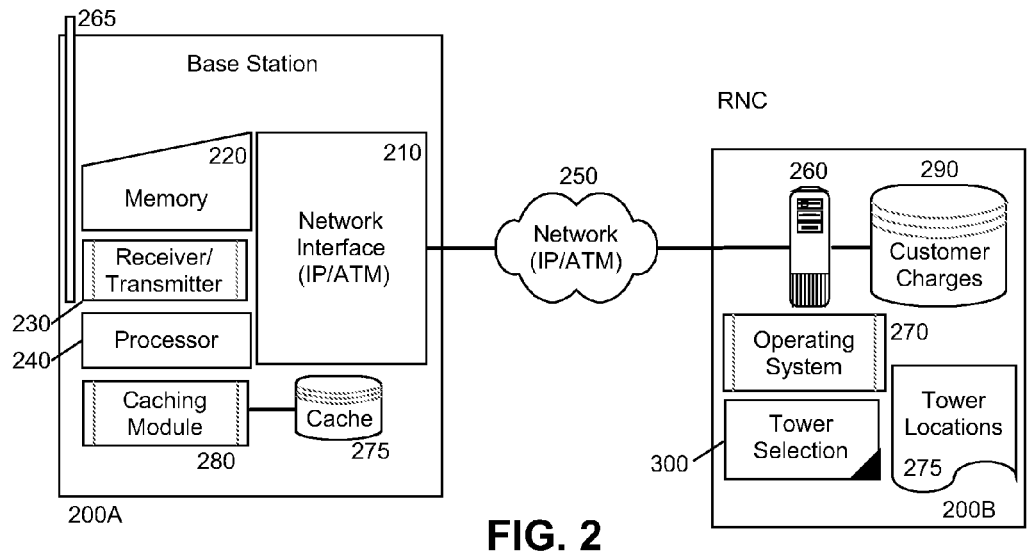
FIG. 2 is a schematic illustration of a RAN data processing system configured for wireless tower caching; and, FIG. 3 is a flow chart illustrating a process for wireless tower caching in a RAN.

In yet further illustration, FIG. 2 is a schematic illustration of a RAN data processing system configured for wireless tower caching. The system can include a base station 200A coupled to an RNC 200B over a communications network 250, commonly an IP network or an asynchronous transfer mode (ATM) network. The base station 200A can include a receiver/transmitter 230 receiving over-the-air communications from different end user devices within transmission range of the base station 200A by way of antenna 265, and routing the same to the RNC 200B by way of a network interface 210. A processor 240 can be provided to perform computational processing on received data as the data is placed in memory 220. A caching module 280 coupled to a content cache 275 can execute by the processor 240 of the base station 200A. The caching module 280 can perform caching of cacheable content in the cache 275 for content received in the base station 200A in response to requests from coupled end user devices and from directives received from the RNC 200B.

The RNC 200B, in turn, can include a host computer 260 with at least one processor and memory supporting the execution of an operating system 270. The operating system 270 in turn can host the execution of a location-based wireless tower caching module 300. The location-based wireless tower caching module 300 can include program code that when executed in the operating system 270, can receive responses to requests from over the data communications network 250 can determine geographic positioning data for a response to a request from over the data communications network 250. The program code further can compare the determined geographic positioning data to a list of known locations 275 of different wireless towers communicatively linked to the RNC 200B. Finally, the program code can direct caching of the response in a base station 200A of a wireless tower identified as closest to the geographic positioning data of the response.

Figure 3:
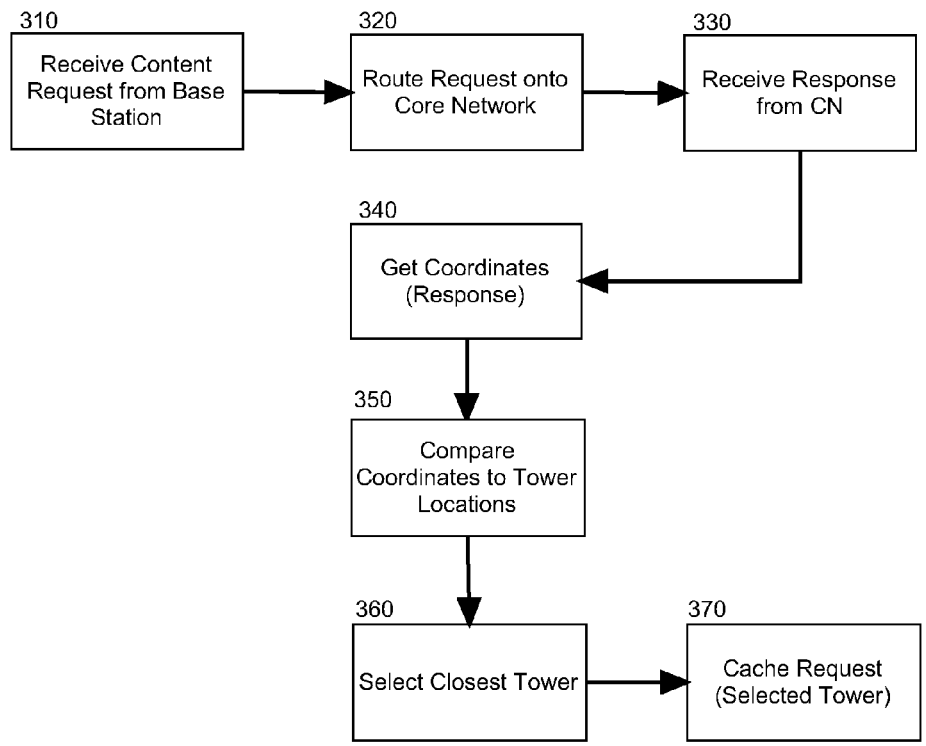

In even yet further illustration, FIG. 3 is a flow chart illustrating a process for wireless tower caching in a RAN. Beginning in block 310, a content request can be received from a base station on behalf of an end user device wirelessly accessing the base station. In block 320, the request can be routed onto the CN for ultimate processing by a content provider on the global Internet. In block 330, a response to the request can be received from over the CN and in block 340 geographic positioning data for the response can be determined. For example, the GPS coordinates of a point of interest on a map, or an address from which a map has been generated in the response can be determined. In block 350, the determined geographic positioning data can be compared to a list of known locations of wireless towers communicatively coupled to the RAN. Subsequently, in block 350 a closest one of the wireless towers can be selected and in block 370 the response can be cached at a base station of the selected wireless tower.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for wireless tower caching in a radio access network (RAN) comprising:

receiving a response to a content request from an end user device wirelessly coupled to a base station of the RAN, the base station comprising an antenna supported by a separate wireless tower, the response comprises at least one of a map generated from an address supplied by the end user device or a point of interest of a map generated from an address supplied by the end user device;

determining geographic positioning data for the response;

comparing the determined geographic positioning data for the response to a list of locations of wireless towers in the RAN to identify a most geographically relevant wireless tower coupled to the RAN relative to the determined geographic positioning data, the most geographically relevant wireless tower being geographically closest to the received response to the content request; and, caching the response at a cache in the base station of the identified most geographically relevant wireless tower.

2. The method of claim 1, wherein receiving the response to the content request from the end user device wirelessly coupled to the base station of the RAN, comprises receiving a response in a radio network controller (RNC) to a request from an end user device wirelessly coupled to a base station of the RAN.

3. The method of claim 1, wherein the geographic positioning data comprises geographic positioning system (GPS) coordinates.

4. The method of claim 1, wherein the geographic positioning data comprises at least a portion of the address supplied by the end user device.

* * * * *